April 25, 1961 K. G. ZEIDEN 2,981,062
METHOD AND APPARATUS FOR SAFE OPERATION OF ENGINES
Filed May 21, 1957 5 Sheets-Sheet 1

INVENTOR.
KEITH G. ZEIDEN
BY
Christie, Parker & Hale
ATTORNEYS

April 25, 1961 K. G. ZEIDEN 2,981,062
METHOD AND APPARATUS FOR SAFE OPERATION OF ENGINES
Filed May 21, 1957 5 Sheets-Sheet 3

INVENTOR.
KEITH G ZEIDEN
BY
*Christie, Parker + Hale*
ATTORNEYS

April 25, 1961 K. G. ZEIDEN 2,981,062
METHOD AND APPARATUS FOR SAFE OPERATION OF ENGINES
Filed May 21, 1957 5 Sheets-Sheet 4

INVENTOR.
KEITH G. ZEIDEN

BY

ATTORNEYS

April 25, 1961 K. G. ZEIDEN 2,981,062
METHOD AND APPARATUS FOR SAFE OPERATION OF ENGINES
Filed May 21, 1957 5 Sheets-Sheet 5

INVENTOR.
KEITH G. ZEIDEN
BY
Christie, Parker + Hale
ATTORNEYS

United States Patent Office
2,981,062
Patented Apr. 25, 1961

2,981,062

METHOD AND APPARATUS FOR SAFE OPERATION OF ENGINES

Keith G. Zeiden, Los Angeles, Calif., assignor to Arnoux Corporation, Los Angeles, Calif., a corporation of California Filed May 21, 1957, Ser. No. 660,555

7 Claims. (Cl. 60—39.09)

This invention relates to a method and apparatus for the safe operation of engines and more particularly to engines of the type having an exhaust stream such as jet and turbojet engines and the like.

With modern advances in the field of aviation the need for powerful engines necessary to reach and sustain flight at very high speeds has created a great demand for engines of the jet and turbojet types. Numerous failures which have resulted in propulsion systems of this type are attributable in part to the high operating temperatures involved and to the high speed at which moving parts such as turbine blades are operated. While statistics relating to propulsion or power plant failures must be viewed with suspicion and employed only with caution because of their incomplete nature and the inconsistency from time to time of in-flight observers' reports, they nevertheless indicate that certain symptoms precede an engine failure.

In the majority of engine failures resulting in damage, disintegration, explosion, etc., there is, prior to such failures, a deterioration of engine component parts. The deterioration of either or both rotating parts such as turbine blades or stationary parts positioned with very close tolerances adjacent to rotating parts results in minute quantities of metal, metal particles, oxides or compounds, not normally present except in small quantities or non-existent altogether, being cast into the exhaust gases. The deterioration here referred to includes overheated as well as abraded parts.

Overheated turbine blades, as might result from accidental restriction of air intake among other causes, may result in actual melting of tips and edges, causing globules of metal or its oxides to enter and be discharged in the exhaust stream. In some instances a cracked or otherwise damaged part may expose sharp and irregular outlines which may be attacked by the combustion taking place and evidenced by a sharp increase of metal or metallic compounds in the exhaust stream. With engine parts exposed to high operating temperatures oxidation of the metallic surfaces results in a somewhat brittle encrusting film or scale which serves usefully as a thermal barrier that affords some protection to the metal from the high temperatures. In the event of excessive vibration, such as might result from unusual movement of a single blade or the introduction of even minute foreign particles in the air stream, a disturbance of the nominal scale or skin deposits may occur. Consequently, flakes of the encrusting scale or skin deposits enter and are discharged in the exhaust stream, and areas of the exposed metal where flaking takes place are soon oxidized and again coated with a scale. Even though vibration or movement may not be noted as an abnormal vibration or roughness of the engine as a whole, it may nevertheless be sufficient to cause an appreciable discharge of nominally attacked oxide films, scales, etc., into the exhaust stream in quantities greater than normal. Moreover, even abnormal stressing of a component may result in an appreciable discharge of such scales or oxides. The presence of such oxides in the exhaust stream may continue until a new encrusting film is formed over the flaked areas.

The presence of metal particles by abrasion may result from either misalignment or distortion. With minute tolerances between stationary and moving parts, misalignment either axially or radially can cause abrasion and consequent introduction of metal particles into the exhaust stream. Sometimes a distortion by heating of parts to some temperature below the melting point results in the distortion of parts sufficient to exceed the small tolerances and cause abrasion; whereas in other instances foreign matter such as ice in the intake stream may cause the physical distortion of parts and resulting abrasion.

Bearing in mind that any one or all or a combination of the foregoing factors may result in the presence of metal particles or oxides in the exhaust stream, it is well to point out that, depending upon the type of engine involved, the operating temperature, the constituent metals and other factors, there may be some quantity of metallic oxides normally present in the exhaust stream. The continued presence of an excessive number of metallic oxides is a sympton of engine deterioration, and the presence of even minute quantities of metallic particles is a symptom of engine deterioration. A principal feature of this invention is to distinguish between the quantities of metallic oxides present in the exhaust stream under normal operation of an engine of any given type and an abnormal quantity of such particles present in the exhaust stream of an engine preliminary to an engine failure resulting in damage or disintegration. A principal feature is to detect even minute quantities of particles of the metal or metals of which the component parts of an engine are constructed. According to another feature a new method is provided for minimizing hazards in engines of this type which includes the steps of examining the exhaust stream, detecting the presence of matter therein indicative of an imminent hazard, and timely adjusting one or more engine controls whereby safe operation is maintained. While the method is particularly adaptable to engines of the jet and turbojet type, it is nevertheless useful with all types of engines having an exhaust stream, including the conventional internal combustion type piston engines.

Because of the large number of instruments which a pilot is required to monitor while in flight, the amount of time which he can devote to any one instrument may be relatively small. An engine failure of the type herein described may occur in a few seconds or in some cases in a matter of fractions of a second. With an instrument on the pilot's panel indicating the quantity of metal particles in an exhaust stream, it is possible for an alert pilot to make a timely correction when an imminent hazard is indicated. In the interest of relieving a pilot of the duty of constantly observing such an instrument on the control panel, however, it is desirable to provide for automatic correction whereby the engine controls may be manipulated for safe operation in a matter of milliseconds. Safe navigation is thereby insured and the pilot is relieved of a constant burden.

According to the principles of the present invention, a novel apparatus is provided which may be used with an engine to indicate the quantity of one or more types of metal particles being discharged in the exhaust stream. From a systems aspect the invention includes an engine of the type having an exhaust stream, controls for operating the engine, a detector associated with the exhaust stream for determining the quantity of metal particles present, and a control mechanism responsive to the detector for operating one or more engine controls to correct for any abnormality indicated. An indicator on the instrument panel is preferably included so that the pilot may be constantly informed of the operating condition of the engine. For multiple engines a duplicate system of this sort is employed for each engine.

In essence the detector may be employed to provide an electrical signal which varies as a function of the particle content in the exhaust stream. In response to the variable signals, the mechanism adjusts the engine controls to reduce the engine speed or temperature or stop the engine altogether. Included in the engine controls are those which limit or adjust the fuel injection, air intake, ignition and other factors unique to a given type of engine. Whenever the particle rate is excessive and engine speed is to be controlled, it is preferable to reduce the engine speed to an idling speed in order to keep the engine operative if possible and to stop the engine altogether only if the particle rate continues in excessive amounts after idling speed is reached.

In one embodiment of this invention, a catalyst may be added to the exhaust stream of a turbine or jet engine where, admixed with the hot gases in a vaporized or finely divided state, it combines with any metal or compounds of metal present to provide a characteristic phenomenon that may be monitored. If certain catalysts are added with various metal particles, they may be made to emanate a characteristic color at 1800° F. to 2000° F. where they would not otherwise emanate such color under about 2700° F. It has been found that mixtures of the halogen group serve this purpose. A calcium-ferrofluoride mixture, calcium-silicon fluoride or chlorine gas, for several examples, provides a characteristic glow, the color of which depends upon the metals present and the intensity of which is a factor of the concentration of the metals present. The calcium serves as a vehicle of such nature as to permit the solution or suspension of the active compounds in a fluid which might be either admixed with the fuel or added separately by a suitable injection in the air stream. The ferrous or silicon content provides a temporary holding agency for the active fluoride. Upon contact at high temperatures, the halogen (fluoride or chloride) combines with either iron, nickel, cobalt, chromium, etc. particles to form a series of complex fluorides or chlorides and simultaneously produce a characteristic spectrum. Once diffused in the hot gases a definite and intense glow appears in the exhaust gas. One milligram of metal per second introduced into an air gas flow of one thousand cubic feet per minute is readily detected without the need of sensitive detection instruments, but smaller quantities of metal per unit volume of air flow are easily detected by more sensitive detection instruments. Compounds of groups other than the halogen group may be admixed with the hot gases in an engine of this type provided that they combine with metal particles present in the exhaust stream to yield a characteristic glow the color of which is indicative of the metals present and the intensity of which varies with the concentration of the metals present. With suitable light filters associated with photoelectric devices, an electrical signal may be provided which varies in intensity with the concentration of metal particles. One or more such filters and photoelectric cells may be employed for each type of metal to be monitored. Once a catalyst is admitted either in the exhaust stream or by separate injection beforehand into the fuel or air stream, the characteristic glow may be monitored by a filter located downstream and conveyed through a lens to a sensitive photoelectric device which provides an electrical signal output. A prism may be employed instead of multiple light filters to divide light into its various colors and direct it to photoelectric devices. As the concentration of metal particles varies, the amplitude of the signals from the photocell devices varies accordingly. The output signals may be supplied to a computing device, integrating network and the like from which a control signal may be provided to an engine control mechanism which in turn adjusts air intake, fuel and the like. If the quantity of metal particles in the exhaust stream should exceed a predetermined concentration, the control mechanism may be caused to shut the engine off as by completely closing the fuel injection device, or otherwise. It is permissible to install suitable meters, warning lights, audible alarms, etc., to indicate to the pilot or engineer of an aircraft the safe or unsafe operating status of an engine, and in the case of extreme or hazardous circumstances, automatic override devices can take control of an engine as by reducing the fuel, admitting extra air, or even rendering the engine inoperative.

In another embodiment according to the present invention, detection of both metals and metal compounds in the exhaust stream may be accomplished by electromagnetic detection by monitoring for the various electromagnetic effects of fast moving particles. It is not absolutely essential that the particles in the exhaust stream be truly magnetic in nature because there is active electron movement sufficient to produce a minute magnetic field while compounds break down or reform other compounds in the exhaust stream. Many of the particles, particularly oxides, bear an electrostatic charge or may have such charge introduced. Accordingly a winding or coil is associated with the exhaust stream so that charged particles or magnetized particles pass at high speeds through the center portion of the coil. This induces fluctuating voltages in the coil which vary in amplitude to indicate in a quantitive manner the relative amount of metals and metallic compounds passing through the exhaust stream. Electrical signals from such a winding may be amplified and supplied to an engine control mechanism and an indicator on the control panel.

In another embodiment of the present invention, a pair of grid networks located in but displaced from one another in the exhaust stream may respond to electrostatic charges existing on the particles. The difference in charge on the two grid networks may be supplied to the grid of the vacuum tube for amplification and then as a control signal to actuate either or both indicating instruments and a servo mechanism. A combination of magnetic and electrostatic fields may be employed to concentrate particles in a particular area of the exhaust stream in order to improve overall sensitivity, for as a practical matter the electrical winding and electrostatic grids may be duplicated at several points in the exhaust stream to serve the dual function of alternately concentrating and detecting moving particles.

In a further embodiment according to this invention, radiation which might be described as beta radiation and a more pronounced radiation of ultraviolet light of extremely short wave length are detectable from the particles of metals and compounds in the inner incandescent portion of the exhaust stream. Such phenomenon may be particularly noted when active chemical compounds are present, apart from the activity of any admitted compounds in and of themselves. Geiger counters or ionization tubes provide pronounced indications under these circumstances. Accordingly, Geiger counters or ionization tubes may be employed with the exhaust stream to provide an output signal which varies as the concentration of metal particles, and such output signal may be employed to actuate an indicator or servo mechanism or both. Engine parts may be preactivated such as with radioactive cobalt, for example, and gamma radiation detected as such parts deteriorate and cast particles into the exhaust stream.

According to another embodiment of the present invention a target structure may be associated with the exhaust stream, and the effects of metal particles striking the target may be used to measure the concentration. Certain types of crystals such as calcite crystals, for example, undergo a change in their electrical surface resistance when particles impinge on the surface thereof. If connected in a series circuit with a source of current, the current in the circuit varies in amplitude as a function of the concentration of particles in the exhaust stream impinging on the crystal. A signal may be coupled from such a circuit to an amplifier and supplied to an indicator or control mechanism.

In another embodiment the target may consist of a chemical indicator such as gelatin or fluid pH which provides rapid reaction with the particle materials and varies in electrical conductivity in direct proportion to the concentration of particles impinging thereon. A target of this sort may be employed in a series circuit with a source of current and an output signal provided which varies in amplitude with the particle concentration impinging thereon to operate a control mechanism or indicator. Alternatively, the target may be composed of a chemical such as a gelatin test reagent which is optically clouded in proportion to the number of particles impinging thereon. Phenolphthalein indicators may be suitably employed for the purpose. Such a target may be interposed between a light source and a photoelectric cell device and used to control the magnitude of the electrical signal from the photocell in direct proportion to the concentration of particles. An output signal may be employed to operate a control mechanism or indicator.

In a further embodiment a target may consist of a simple semi-conducting maze filter. The electrical conductivity varies as a function of the concentration of particles entrapped therein. When employed in a series electrical circuit with a source of current, an output signal may be provided which varies in amplitude in direct proportion to the concentration of trapped particles. Such output signal may be amplified and caused to operate a servo mechanism or an indicator.

According to a further embodiment a trap is provided wherein the exhaust stream is sampled and the particles are collected in a trap. The trap may be inspected before each flight to provide an indication of the previous operating condition of the engine. While not an accurate means of measuring, the trap does offer a rough indication that an engine was or was not performing within safe margins during the previous flight. Such a device may be particularly useful for laboratory purposes such as calibrating some of the foregoing detectors and the like.

This and other features of this invention may be more fully appreciated when considered in the light of the following specification and drawings in which.

Figure 1:
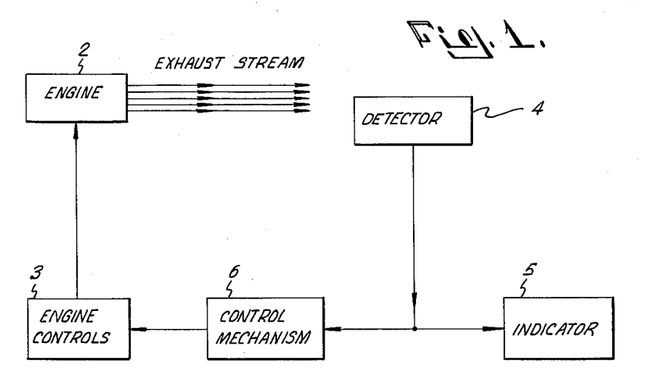
Fig. 1 is a block schematic illustrating the invention incorporated into a system.

Referring first to Fig. 1, the invention is illustrated from its system aspects by means of a block diagram. An engine 2 of the type having an exhaust is provided with engine controls 3 for regulating fuel injection and air intake as well as other controls unique to a given type of engine. A detector 4 associated with the exhaust stream provides an output signal to an indicator 5 and a control mechanism 6. The amplitude of the signal varies as the concentration of particles in the exhaust stream and is indicative of certain conditions within the operating engine. If the detector senses an excessive concentration of particles, its output signal may operate the control mechanism 6 to adjust the engine controls 3 and thereby reduce the operating temperature or reduce the speed of the engine. Should the particle concentration continue in excessive amounts or should the concentration further increase, the detector 4 may cause the control mechanism to operate the engine controls 3 to shut down the engine completely.

Figure 2:
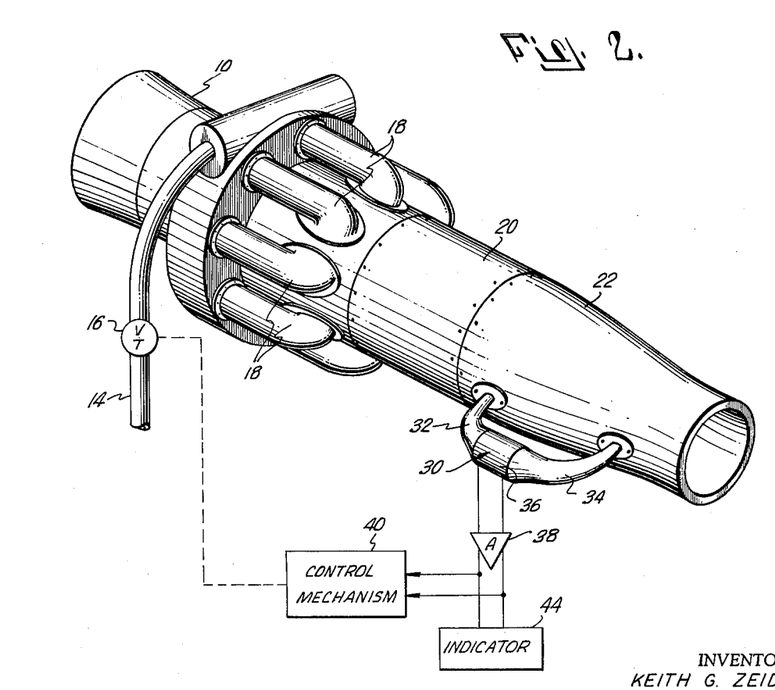
Fig. 2 illustrates how the invention may be incorporated with an engine of the jet or turbojet type.

Reference is made to Fig. 2 where, for purposes of illustration, the invention is shown in conjunction with a jet engine. While jet and turbojet engines vary as to form and details, they generally include in each instance a nose portion through which intake air flows to a compressor, a fuel injection device, a firing chamber, a turbine driven by the hot gases and a tail pipe section through which the hot gases are exhausted. In other types of engines, such as ram jets, the turbine is omitted. In the illustrative engine of Fig. 1 intake air flows through the nose portion 10 to a radial flow compressor which supplies compressed air to a firing chamber 12. The fuel received from a line 14 through a throttle valve 16 is admixed with the compressed air and burned in the firing chamber 12 to produce hot gases which flow through the conduits 18, constituting part of the firing chamber, to the turbine section 20 of the jet engine. Hot gases exhausted from the turbine section 20 pass through a tail section 22 to the atmosphere. The speed of an engine of this sort may be increased or diminished by correspondingly increasing or decreasing the rate at which fuel or air is supplied. Fuel and air rate may be controlled in combination to vary the speed, power and operating temperature of an engine. For convenience normal control of the engine in Fig. 2 by controlling the fuel rate is arbitrarily selected. While the invention is illustrated with respect to control of fuel rate it is to be understood that the control of the rate of fuel injection, air intake, other factors relating to the control of an engine, or a combination of these factors may be utilized with applicant's invention.

For the purpose of determining the particles present in the exhaust stream of an engine of this sort, applicant provides a particle detection device associated with the exhaust stream. Detection devices may be positioned in or around the exhaust stream, or a portion of the exhaust stream may be diverted and particle content detected on a prorated basis. In Fig. 2, a sampler unit 30 is attached to the tail section of an engine, and a portion of the hot gases are diverted from the exhaust stream, passed through the sampler unit and back into the tail section. The entry section 32 is preferably located adjacent the after section of the turbine so as to receive particles cast outwardly from the turbine by centrifugal force. The hot gases leaving the sampler unit are conveyed through the exit section 34 back to the tail section 22 where they are exhausted to the atmosphere. As pointed out more fully hereinafter, the center section of the sampler unit 36 may include various detection devices which provide an electrical signal to an amplifier 38 having an amplitude which varies in proportion to the concentration of particles in the exhaust stream. Signals from the amplifier 38 are applied to a control mechanism 40 which in turn operates the throttle valve 16. The control mechanism 40 may include various types of well known devices which respond to an electrical signal to operate a mechanical device, i.e., a throttle valve in this instance. In one preferred arrangement the control mechanism responds to a signal of a predetermined amplitude to set the throttle valve 16 to a position where the engine operates at an idling speed, and the control mechanism operates in response to a signal of greater predetermined amplitude to close the throttle valve completely. With a two-step control of this sort, the control mechanism may respond to an excessive particle rate to set the engine at its idling speed and thereby maintain the engine operative where the excessive particle rate is of a temporary nature. Where the particle rate may continue to increase after the engine is set at idling speed, indicative of an impending hazard likely to cause engine failure, the control mechanism may respond to a signal of predetermined amplitude to shut the engine down by closing the throttle valve 16. Should a pilot determine that it is necessary at all costs to continue operating the engine, an automatic override device may be provided whereby the control mechanism may be rendered inoperative when the override mechanism is in use. In such instances the particle rate in the exhaust stream may be constantly presented to a pilot or flight engineer by means of an indicator 44 which may be in the form of a visual or audible alarm or a combination of the two.

Figure 3:
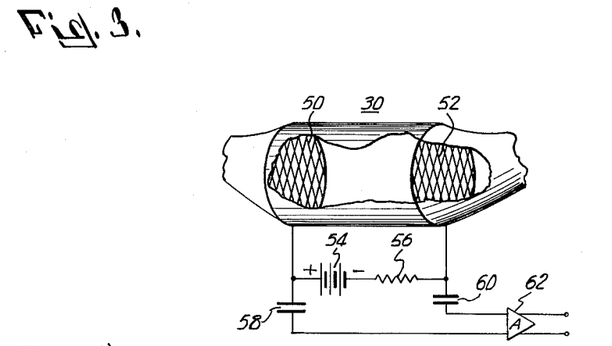
Fig. 3 illustrates one embodiment of the invention for detecting metal particles in a sampler unit.

Referring next to Fig. 3, the sampler unit 30 in Fig. 1 is in enlarged form and partially broken away to illustrate the arrangement of a grid type detection device. A pair of grids 50 and 52 are positioned as shown so that the sampled portion of the exhaust stream passes through both grids. A battery 54 and resistor 56 are connected between the grids to provide a high charging potential. If no particles flow between the grids 50 and 52 the static potential on the grids remains constant. Once particles begin to flow between the grids, the grid 50 serves to provide the particles with a high positive charge. The particles then pass toward the grid 52 where the charge is given up. The greater the concentration of particles, the greater the transfer of charges between the grids 50 and 52. The change in potential between the grids 50 and 52 is coupled by means of condensers 58 and 60 to an amplifier 62 where amplification takes place before they are applied to an indicator and control mechanism as shown in Fig. 2.

Figure 4:
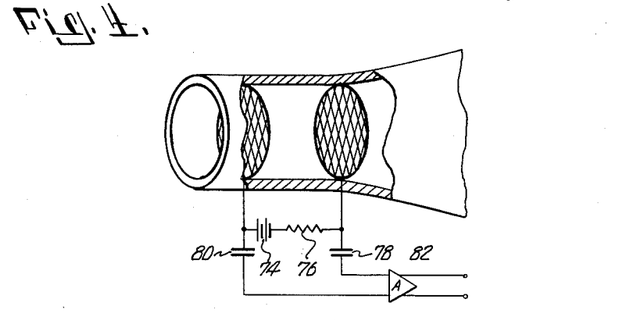
Fig. 4 illustrates a similar arrangement for detecting metal particles in the tail section of an engine.

In Fig. 4 the grid network is shown alternatively disposed in a partial tail section of the jet engine in Fig. 2. The grids 70 and 72 are arranged in a similar manner across a battery 74 and resistor 76. A change in voltage developed across the grids 72 and 74 is coupled by condensers 78 and 80 to an amplifier 82. Here the potential developed across the grids 70 and 72 may be greater than that developed across the grids 50 and 52, and the amplification factor of the amplifier 80 may be adjusted so that the output signal is equal in amplitude to that from the amplifier 62 where it is desired to maintain a signal of given amplitude to the control mechanism and indicator device.

Figure 5:
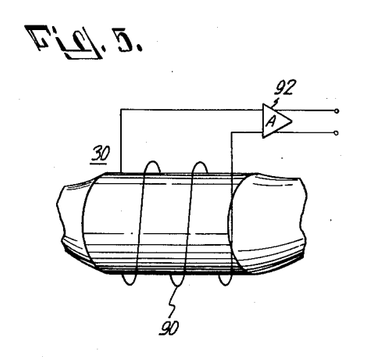
Fig. 5 illustrates another embodiment of the invention for detecting particles in a sampler unit.

Referring next to Fig. 5, the sampler unit 30 of Fig. 1 is shown enlarged and partially broken away with a coil 90 disposed therearound. As particles in the exhaust stream pass through the sampler within the coil 30, a voltage is induced in the coil having a magnitude which varies in a quantitative manner with the relative amounts of metals and metallic compounds in the exhaust stream. Signals induced in the coil 90 may result from several causes. First, magnetized particles in the exhaust stream passing through the coil create a signal by virtue of electromagnetic induction. Second, it is not absolutely essential that the particles in the exhaust stream be truly magnetic in nature because there is active electron movement sufficient to produce a minute magnetic field while compounds break down or reform other compounds in the exhaust stream. Such particles may induce a voltage in the coil 90 by electromagnetic induction. Third, many of the particles, particularly oxides, may become ionized or bear an electrostatic charge, and the passage of these particles through the coil 90 may induce a signal therein. Any one or a combination of the foregoing factors may serve to establish a fluctuating signal in the coil 90 having an amplitude representative of the particle concentration in the exhaust stream. Induced voltages in the coil 90 may be amplified in an amplifier 92 and applied to an indicator and a control mechanism in the manner taught in Fig. 2.

Figure 6:
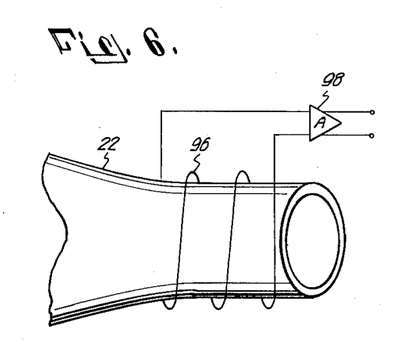
Fig. 6 illustrates a similar embodiment for detecting metal particles in the tail section of an engine.

Referring next to Fig. 6, the use of a coil is illustrated on a partial tail section 22 of the jet engine in Fig. 2. A coil 96 and amplifier 98 perform as the coil 90 and amplifier 92 in Fig. 5. The signal induced in the coil 96 may exceed that induced in the coil 90 of Fig. 5 because of a greater number of particles passing through the tail section 22 in Fig. 6. The gain of the amplifier 98 may be adjusted however in order to provide an output signal varying in amplitude similar to that from the amplifier 92 in Fig. 5 if it is desired to maintain the output signal within prescribed limits.

Figure 7:
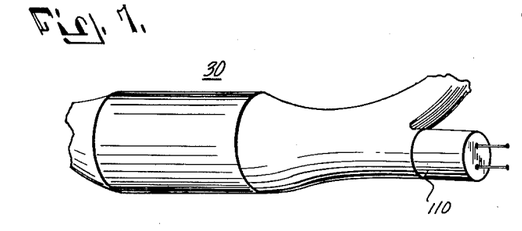
Fig. 7 illustrates another type of sampler unit according to the present invention.

Referring next to Fig. 7, the sampler unit 30 of Fig. 2 is shown in modified form with a detachable cap 110 positioned in a manner to cause particles in the exhaust stream to impinge upon a target element positioned therein. As pointed out below, the target element and its associated circuit may include various arrangements.

Figure 8:
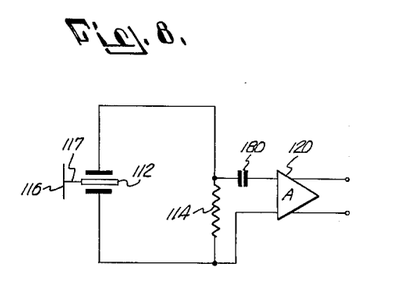
Fig. 8 illustrates a piezoelectric crystal arrangement for detecting metal particles in a sampler unit.

In Fig. 8, for example, the target element may be in the form of a piezoelectric crystal 112 connected serially with a resistor 114. Particles impinging on the piezoelectric crystal 112 cause a change in the electrical characteristics of the crystal. The electrical characteristics changed may include the surface resistance as well as the frequency if the crystal is oscillating. If the resistance is changed, a signal across the resistor 114 varies in amplitude, and it may be coupled by means of the circuit arrangement shown including a condenser 118 to an amplifier 120 from which it may be applied to actuate an indicator and a control mechanism as in Fig. 2. Particles may impinge on a member 116 and the force of impact may be transmitted to the crystal 112 by an arm 117, though this arrangement is optional.

Figure 9:
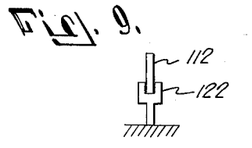
Fig. 9 shows a mounting arrangement for a piezoelectric crystal.

As shown in Fig. 9, the crystal 112 may be supported by a holder 122 and the particles allowed to impinge on the crystal itself.

Figure 10:
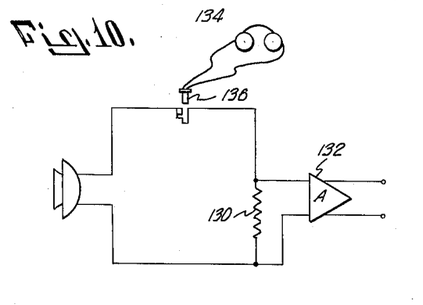
Fig. 10 illustrates a pickup device employed to detect metal particles in a sampler unit.

In Fig. 10 another type of target element and associated circuit are shown. The target element here comprises an electrical pickup device such as a microphone, and particles striking the pickup device cause a variable signal to appear across a resistor 130. The amplitude of the signal developed across this resistor varies as a function of the number of particles striking the pickup device per unit of time. This signal is amplified in an amplifier 132 and supplied as an output to an indicator and control mechanism. Where audible monitoring is desired, a set of earphones 134 and connecting phone jack may be electrically connected in the circuit.

Figure 11:
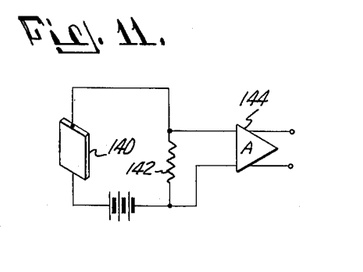
Fig. 11 illustrates a target element for detecting metallic particles by undergoing a change in electrical resistance in proportion to the number of particles impinging thereon.

In Fig. 11 a target element 140 is shown which may be composed of a chemical substance that changes its surface resistance when particles impinge thereon. Calcite crystals, for example, are suitable for this purpose.

The calcite material essentially acts as a flux which undergoes slight melting at the surface when tiny hot particles of metal and metal oxides impinge thereon. There is effervescence of the metal particles and oxides at the point of impact with the calcite, and shortly thereafter the metallic particles and oxides are expelled from the calcite back into the exhaust stream. In the process the electrical resistance of the calcite target element 140 is changed and this causes a signal to be developed across a resistor 142 which varies in amplitude with the rate at which particles impinge on the calcite target 140. The variable signal across the resistor 142 may be applied to an amplifier 144 and then to an indicator and control mechanism.

Figure 11A:
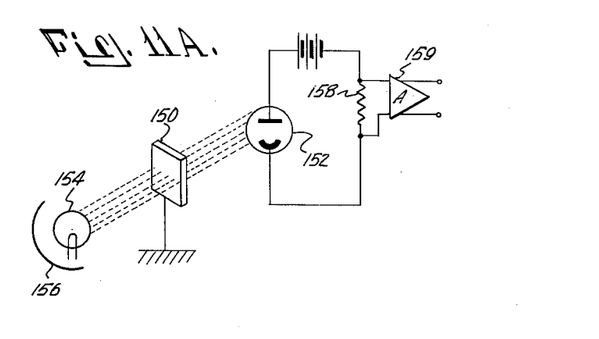
Fig. 11A illustrates a target element for detecting particle concentration by a proportionate change in its light transmission characteristic.

In Fig. 11A a target electrode 150 is positioned between a photocell 152 and a light source 154. A reflector 156 concentrates the light on the target 150 which may be composed of a gelatin test reagent such as phenolphthalein, for example, or other type of material which may be optically clouded when metallic particles impinge thereon. When mounted in the sampler unit, the target element 150 is optically clouded as particles strike the surface. As the concentration of particles striking the target vary, the intensity of the light passing through the target varies. Accordingly, the photocell 152 provides an output across the resistor 158 to the amplifier 159 which varies as the concentration of particles. The output signal from the amplifier 159 may be employed to actuate a control mechanism and an indicator as in Fig. 2.

Figure 12:
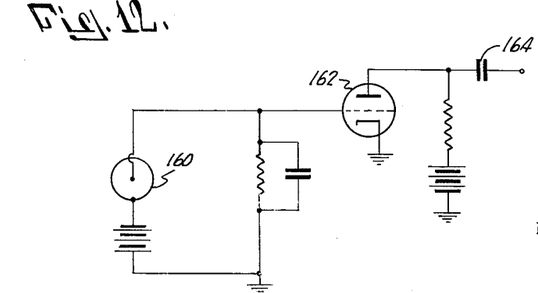
Fig. 12 illustrates an arrangement for detecting particle concentration in the exhaust stream of an engine by measuring radiation of the particles.

As shown in Fig. 12 the target element may include a scintillation or Geiger counting element 160. Various types of radiations including alpha, beta and gamma may be encountered with the particles of the jet stream. Although the radiations may be very minute in intensity, they may nevertheless be detected and amplified in a triode 162 and supplied as an output signal through a condenser 164 to an indicator and control mechanism as in Fig. 1. The amplitude of the output signal varies in proportion to the number of emitting or active particles impinging on the target element 160.

Elements of an extremely active nature may be injected into the exhaust stream, preferably downstream from the burning chamber or turbine to minimize reaction with the engine parts as much as possible, where they react with metallic particles and oxides thereof at the extreme temperatures. Sufficient electron excitation may occur to cause low-grade beta radiation which may be detected by a Geiger counter or the like. It is feasible, though for various reasons it may not be desirable, to preactivate turbine blades or other parts with radiate active cobalt for example. As deterioration of the blades or parts takes place, gamma radiation of the particles is then easily detected by a Geiger counter 160. In order to eliminate the possibility of collecting radioactive particles in or around a counter, it is preferable to mount the counter device in the central portion 36 of the sampler unit shown in Fig. 2 instead of in the cap portion 110 of a sampler unit of the type shown in Fig. 7. For reasons of public safety it may be desirable to filter or collect the radioactive particles in the exhaust stream. Such may be accomplished by charging the particles in the exhaust stream at some point in the tail section of the engine and collecting them at an electrode of opposite charge positioned downstream at or near the end of the tail section of the engine.

Metal particle concentration in the exhaust stream of an engine may be detected in several ways by means of light sensitive detecting devices. Various metals of which an engine may be constructed emanate characteristic colors when subjected to high temperatures, active chemical or a combination of temperature and active chemicals. The colors may be more easily detected in some instances by using a catalyst to increase excitation at lower temperatures. The catalyst may be mixed with the fuel or injected separately downstream at some point in the tail section of an engine. Alternatively, injection may place in a sample tube wherein only a small portion of the exhaust gases are subjected to the catalyst. Once a catalyst is added, it may mix with the hot gases and combine with any metal or compounds of metal in a finely divided state to provide a characteristic color which varies in intensity with the concentration of the particles. A light-sensitive detector may be employed to provide an output signal which varies as a function of a given color intensity.

A catalytic agent such as calcium-ferro-fluoride mixture or calcium-silicon-fluoride mixture, for instance, provides a characteristic glow when they react with metallic particles, the color of which depends upon the metal particles present and the intensity of which is proportional to the concentration of the metal particles. The calcium in each instance is considered a vehicle of such nature as to permit the solution or suspension of the active compounds in a fluid; whereas the iron or silicon provides a temporary holding agency for the fluorine. Upon contact with finely divided particles at high temperatures, the fluorine combines with such particles as iron, nickel, cobalt, chromium, etc. to form a series of complex fluorides and simultaneously produce a characteristic spectrum depending upon the metals present. The above characteristics are also noted with various chlorides, including chlorine gas used alone. One milligram of metal per second introduced into an air gas flow of one thousand cubic feet per minute is easily detected with ordinary light-sensitive detectors. Smaller quantities of metal per unit volume may be easily detected by more sensitive light detection devices.

Figures 13, 15:
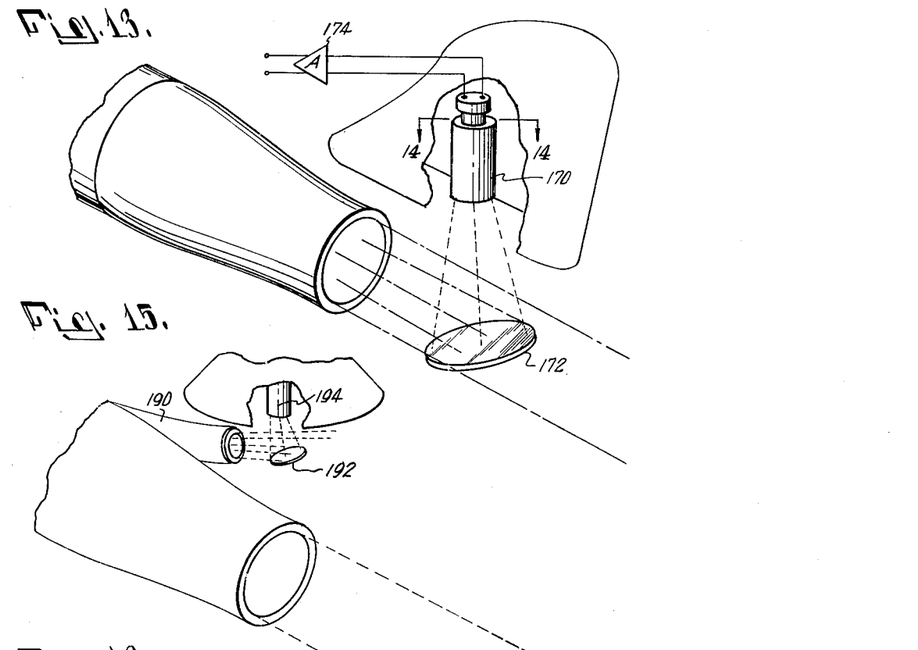
Fig. 13 illustrates a light-responsive device for detecting particle concentration in the exhaust stream of an engine.
Fig. 15 illustrates a light-responsive device for detecting the particle concentration of a sampled portion of an exhaust stream.
Figure 14:
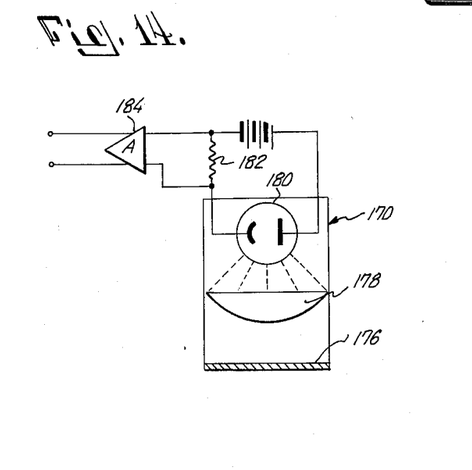
Fig. 14 is an elevation view showing the light-responsive device of Fig. 13 in cross-section along the line 14—14.

Referring next to Fig. 13, a light responsive detector 170 is mounted with respect to the tail section of an engine so that light rays from the exhaust stream may be received. Light striking a mirror 172 is reflected toward the light-sensitive detector 170. The intensity of the light from the exhaust stream may vary with the particle concentration thereof and an output signal provided to an amplifier 174 variable in amplitude with the intensity of the light from the exhaust stream. As shown in a cross-sectional elevation view in Fig. 14, the light-sensitive detector 170 includes a filter 176 which may be used to filter out certain colors of light, a lens 178 for concentrating the light on a photocell 180. An output signal taken across a resistor 182 is applied to an amplifier 184, and this signal may be used to actuate an indicator and a control mechanism as in Fig. 2. Metal particles in the exhaust stream of an engine constructed of a given type of metal may be caused to give off a characteristic glow. The filter 176 in Fig. 14 is selected to pass the characteristic color. In this manner it is possible to examine the exhaust stream for a given type of particle and to provide an output signal from the amplified 184 which varies in amplitude with the concentration of such particles. One or more light-sensitive detectors 170 in Fig. 13 may be employed with the exhaust stream of an engine where it is desired to sense for several types of metallic particles. As an alternative arrangement, a portion of the exhaust gases may be examined as by means of a sampling tube 190 in Fig. 15. Light from the illuminating exhaust stream is reflected by a mirror 192 to a light-sensitive detector 194 which may be of the type shown in Fig. 14.

Figure 16:
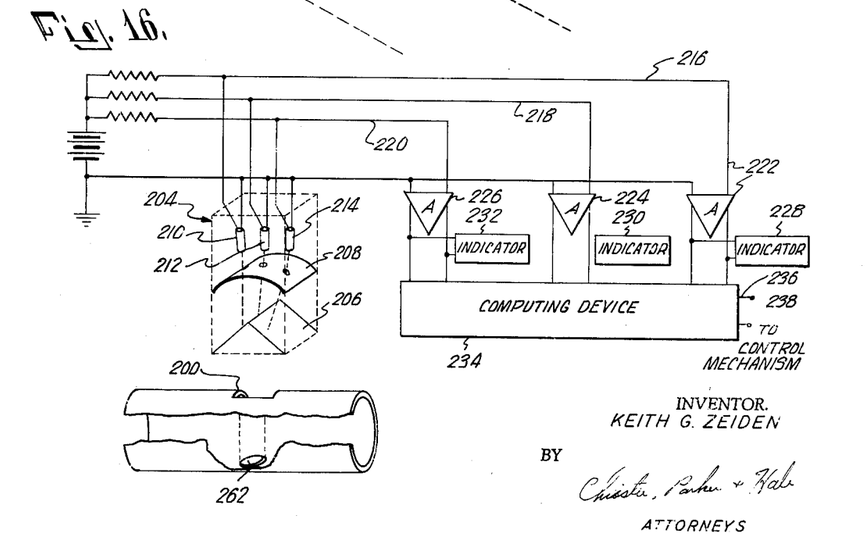
Fig. 16 illustrates a light-responsive arrangement for providing signals to a computing device which may be employed to control an engine safely.

Referring now to Fig. 16, a further arrangement is illustrated wherein a light port 200, located in either the tail section of a jet engine or in a sampling tube, passes light from a mirror 202 to a light-sensitive detector 204. Light from the port 200 is directed to a prism 206 where the various colors are separated and directed through apertures in an arcuate member 208 to photocells 210, 212 and 214. With an arrangement of this sort, it is not necessary to employ various color filters as is the case with the light detector in Fig. 14. As the intensity of the various light colors supplied to the photocells 210, 212 and 214 varies, an electrical signal on corresponding lines 216, 218 and 220 vary in amplitude accordingly. These signals are applied to respective amplifiers 222, 224 and 226, and after being suitably amplified, they are supplied to respective indicators 228, 230 and 232 as well as to a computing device 234. With a system of this sort it is possible to compare the intensities of various colors of light and determine whether one or more of the colors has an excessive intensity, indicating that metal particles and its oxides are present in excessive amounts in the exhaust stream. The computing device 234 may make such determination based upon information supplied to it concerning the particular type of engine, the particular types of metal employed in the construction of the engine, the age of the engine and other factors unique to an engine of a given type. Based upon such a determination in the computing device 234, control signals on output lines 236 and 238 may be used to operate a control mechanism as indicated in Fig. 2.

In some installations it is sometimes desirable to arrange color-responsive photocells with an integrating network so that several known characteristics of a given engine may be continuously sensed. In the absence of metal particles, in the exhaust stream of an engine, the exhaust flame may assume a characteristic color, the intensity of which varies with the operating temperature when a given type of fuel is burned. At the high temperatures involved, metal particles in the exhaust stream may provide a characteristic color depending upon the particular type of metal or metals used in the construction of the engine parts. The presence of oxides of such materials may provide a characteristic color which differs from that of the metal itself. In many engines oxides of the various metals normally are present in various quantities in the exhaust stream. The quantity of such oxides may vary as a functional operating temperature, speed of the engine, types of material employed in engine construction, and the like. It may be convenient in some instances to continuously compare, by photocell devices responsive to characteristic colors, oxide content with flame intensity; while in other instances it may be desirable to constantly sense for the presence of one or more types of metallic particles of which the engine is constructed. The various factors monitored may be compared and analyzed in a computing or integrating device of some sort such as shown at 234 in Fig. 16.

Figure 17:
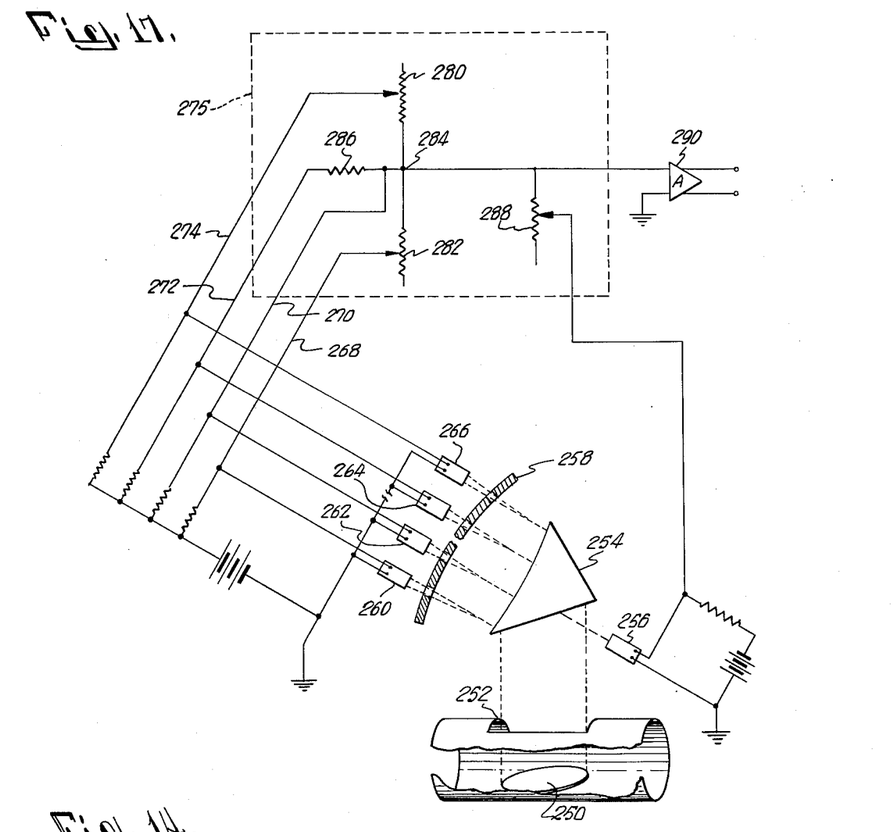
Fig. 17 illustrates another light-responsive arrangement used with an integrating network for controlling an engine safely.

For a given installation an arrangement such as shown in Fig. 17 might be employed. Light reflected from a mirror 250 is directed through a light port 252 to a prism 254. The mirror here and in preceding embodiments may be a polished surface of the tail section or sampler unit, or it may be a piece of polished metal of another type attached in an appropriate location. In many instances the mirror may be eliminated altogether. Some light is reflected from the lower surface of the prism 254 to a photocell 256 while the light passing through the prism is divided up into a color spectrum with light of short wave length emanating to the left from the upper portion of the prism and light of long wave length emanating to the left from the lower portion of the prism. The various colors of light pass through respective holes in a member 258 and activate corresponding photocells 260, 262, 264 and 266. As the intensity of the light applied to the photocells varies, an electrical signal developed on corresponding output conductors 268, 270, 272 and 274 varies accordingly. These conductors are connected to an integrating network 275 shown in dotted line block form. The output signal of conductors 268 and 274 applied to resistors 280 and 282 in a manner to oppose each other at the junction point 284. The potential at this point varies as a function of the difference in potential of the output conductors 268 and 274. The conductor 270 is connected to the junction point 284 while the conductor 272 is connected to this point through a resistor 286. The potential at the junction 284 accordingly varies with the output signals of the output conductors 268, 270, 272 and 274. The output signal of the photocell 256, applied to the junction 284 through a resistor 288, varies with the intensity of light from the exhaust stream, which intensity varies with operating temperature and within certain limits the engine speed. Accordingly, this signal level is useful as a variable reference potential at the point 284 from which the signal levels of the various colors may be made to operate a biased amplifier 290. It should be noted that the polarity of the reference potential from the photocell 256 is opposite to the potential of the color-responsive photocells 260, 262, 264 and 266. The amplifier provides an output signal whenever the signal levels of output conductor 268 or 274 differ by a given amount or either output conductor 270 or 272 provides a signal level of a given amplitude. These potentials, in conjunction with the reference potential, must exceed the cutoff level of the amplifier before an output signal is derived.

For the purpose of simplifying the illustration of the operation of the arrangement of Fig. 17, let it be assumed that the engine employed is constructed of a single material which provides a characteristic color at the operating temperatures and that this color is directed by the prism 254 to the photocell 264; that the presence of oxides in the exhaust stream provide a characteristic color which is directed by the prism 254 to the photocell 266; and that the color of the burning fuel itself, in the absence of either metallic particles or its oxides, provides a characteristic color which is directed by the prism 254 to the photocell 260. As the speed and operating temperature of the engine vary, the intensity of the flaming exhaust stream varies, and the reference potential established at the point 284 by the photocell 256 varies accordingly. If the oxide content normally present in the exhaust stream from the high temperatures of combustion varies substantially with the temperature of the exhaust stream, then the intensity of the color from the oxides and the intensity of the color of the flame cause output signals from respective photocells 266 and 260 to vary substantially alike. The sensitivity of the photocells 260 and 266 may be adjusted if necessary to compensate for any quantitative difference. The outputs of these photocells, being connected in opposing relationship to the resistors 280 and 282, tend to counterbalance each other as the engine speed varies throughout its range. If the intensity of the oxide color exceeds the flame intensity by a given amount, the output signal of photocell 266 overcomes that of the photocell 262. The potential at the point 284 changes against the bias level established by the photocell 256, and an output signal is provided from the amplifier 290 which may actuate an indicator or a control mechanism to reduce the speed, temperature, etc. of the engine. In the event the oxide color intensity continues excessive, the output signal from the amplifier 290 may energize the control system to shut down the engine. In either case an override device may be employed at the discretion of the pilot or flight engineer to inhibit such control action. The override feature is desirable since in some instances the increase in oxide content may be of a temporary nature resulting from an increased burst of speed rather than indicative of a defective condition. The amplifier 290 may be operated by the photocell 264 to provide an output signal when metal particles from the engine are present in the exhaust stream. Since the photocell 264 responds to the color of the metallic particles in the exhaust stream, it is made extremely sensitive so that the amplifier 290 is operated even by the weakest color intensity of the metal particles. The presence of metal particles in the exhaust stream is one of the surest indications of deterioration such as melting of blade tips or small cracks in the structure. Since some of the metal particles may become oxidized, the oxide content as well as the metallic particles may cause increased signals from respective photocells 266 and 262. An increase of either is effective to actuate the amplifier 290, however. Accordingly, the system in Fig. 17 is operative to actuate the amplifier 290 and produce an output signal which may reduce the engine speed when a dangerous condition exists, as indicated by either the presence of metal particles or a disproportionate intensity of oxide and flame colors. All of this is accomplished throughout the range of temperatures at which an engine may be operating.

Accordingly, there is provided a novel arrangement which minimizes the hazards involved in operating an engine of the jet or turbojet type. In each instance the exhaust stream is sampled for one or more types of metallic particles and the oxides thereof, and provides an electrical control signal which may actuate an indicator to inform a pilot or flight engineer, or the control signal may actuate a control mechanism to reduce engine speed as by changing air intake, fuel injection and the like. Alternatively, automatic control action may be taken simultaneously as the engine condition is presented on the indicators to the pilot or flight engineer.

While various types of detector devices have been illustrated and described for sensing deterioration of engine parts and various systems incorporating the detectors have been shown for indicating or taking corrective action, it is to be understood that numerous variations and combinations both as to the detector devices as well as the system itself may be made in view of the teachings of this invention.

What is claimed is:

1. An alarm system for indicating hazardous operation of internal combustion aircraft engines and the like comprising means positioned in the exhaust stream of the engine for detecting the products of internal deterioration of the engine parts in the form of solid particulate matter in the engine exhaust, means for sensing the amount of such solid particulate matter in the exhaust stream, and means responsive to said detecting and sensing means for generating an alarm signal when the amount of solid matter detected in the exheaust stream exceeds a predetermined limit.

2. Apparatus as defined in claim 1 wherein said detecting and sensing means are responsive to the presence of metallic particles and their oxides in minute quantities.

3. An apparatus including the combination of an internal combustion engine of the type having an exhaust stream, first means associated with and responsive to the condition of the engine exhaust stream for detecting the presence of solid matter eroded from the engine parts and present in any unusual amounts in the exhaust stream, the solid matter being indicative of engine deterioration, means for automatically controlling engine operating conditions, and second means coupled between said engine control means and said first means and responsive to the first means for adjusting the operation of said engine in the event of hazardous deterioration.

4. The apparatus of claim 3 wherein said first means includes an electrical device which responds to electrical phenomena of matter present in the exhaust stream indicative of engine deterioration and wherein said first means provides an electrical signal to said second means.

5. The apparatus of claim 3 wherein said first means includes a device which undergoes a change in electrical property and provides an output signal to said second means in the presence of particles in the exhaust stream indicative of engine deterioration.

6. The apparatus of claim 3 wherein said first means includes a device responsive to radiation present in the exhaust stream.

7. The apparatus of claim 3 wherein said first means includes light-responsive devices for determining the presence of light indicative of engine deterioration, and said light-responsive devices provide an electrical control signal to said second means.

References Cited in the file of this patent

UNITED STATES PATENTS

| | | |
|---|---|---|
| 1,333,850 | Kennedy | Mar. 16, 1920 |
| 2,269,674 | Liddel | Jan. 13, 1942 |
| 2,278,248 | Darrah | Mar. 31, 1942 |
| 2,339,754 | Brace | Jan. 25, 1944 |
| 2,524,100 | Dauvillier et al. | Oct. 3, 1950 |
| 2,687,611 | Larsen | Aug. 31, 1954 |
| 2,742,756 | De Boisblanc | Apr. 24, 1956 |
| 2,763,125 | Kadosch et al. | Sept. 18, 1956 |
| 2,797,336 | Loft | June 25, 1957 |
| 2,799,136 | De Boisblanc | July 16, 1957 |

FOREIGN PATENTS

| | | |
|---|---|---|
| 715,769 | Great Britain | Sept. 22, 1954 |

OTHER REFERENCES

"Automotive Industries" Magazine article "Electronic Particle Counter for Engine Combustion Studies," vol. 104, issue 11, pages 52, 88, June 1, 1951.

Lloyd: "Power" Magazine article "Avoid Blade Corrosion and Erosion," April 1952, vol. 96, pages 94–97.